Sept. 2, 1952     K. C. D. HICKMAN     2,609,335
FRACTIONAL DISTILLATION PROCESS AND APPARATUS
Filed May 2, 1944     2 SHEETS—SHEET 1

KENNETH C. D. HICKMAN
INVENTOR

BY
ATTORNEYS

Sept. 2, 1952          K. C. D. HICKMAN          2,609,335
FRACTIONAL DISTILLATION PROCESS AND APPARATUS
Filed May 2, 1944          2 SHEETS—SHEET 2

KENNETH C. D. HICKMAN
INVENTOR
BY
ATTORNEYS

Patented Sept. 2, 1952

2,609,335

UNITED STATES PATENT OFFICE 2,609,335

FRACTIONAL DISTILLATION PROCESS AND APPARATUS

Kenneth C. D. Hickman, Rochester, N. Y., assignor, by mesne assignments, to Eastman Kodak Company, Rochester, N. Y., a corporation of New Jersey Application May 2, 1944, Serial No. 533,796

12 Claims. (Cl. 202—40)

This invention relates to improved process and apparatus for fractionating under vacuum conditions.

It has been appreciated previously that ordinary rectifying columns containing bubble caps, fractionating packing, etc., were unsuitable for vacuum fractionation. This is due to the fact that the packing or bubble caps offer great resistance to the flow of vapors so that pressure was built up in the column. For this reason widely spaced plates offering little obstruction to the flow of vapors to be fractionated have been used for vacuum fractionation. However, such constructions have not been satisfactory. The vapors pass through the column with a high velocity so that efficient interchange betwen reflux and vapors is impossible. Also, droplets of condensate are carried along with the high velocity vapors and contaminate the fractions removed in the condenser.

This invention has for its object to overcome the above difficulties. Another object is to provide improved vacuum fractionating process and apparatus. Another object is to provide improved vacuum process and apparatus permitting efficient interchange betwen vapors and condensate without causing pressure drop. Other objects will appear hereinafter.

These and other objects are accomplished by my invention which includes vacuum fractionating process and apparatus wherein the vapors to be fractionated are caused to pass between opposite surfaces one of which is cooled and the other of which is heated, said surfaces being spaced from each other to permit the vapors to flow therebetween, and conveying at least part of the condensate condensed on the cooled surface onto the opposite heated surface.

My invention is typified by what may be termed the "cooled-stirrer, hot-wall" still. The general construction of such a still may include a pot or flash boiler which communicates with a wide substantially vertical vapor fractionating column, this in turn communicating with a condenser. The walls of the vapor column are supplied with heat in a controlled manner. Within this assembly there is a long stirring member, the lowest portion of which preferably dips into the distilland, producing violent agitation. The central portion of the stirrer; namely, that which is within the vapor column, is hollow and is supplied with a cooling fluid—air, water, oil, etc. During the operation of the still, vapor generated in the pot attempts to ascend the column and is partially or wholly condensed on the rotating member. The condensate is flung by centrifugal force from the member to the heated walls of the vapor column. Here partial re-evaporation occurs while that portion which has not at any moment re-evaporated falls downwards toward the pot. The evaporated portion, on the other hand, passes upwards and towards the center. As a net result there are many condensations and re-evaporations, the heavier constituents tending to pass down the column, the lighter constituents tending to pass up. A fractionation exceeding one theoretical plate and often amounting to many plates is achieved.

Superimposed on the cumulative re-evaporations and condensations is a direct interchange between vapor and liquid as the various portions of condensate are flung centrifugally from the cooled stirrer to the hot walls. I consider as within the scope of my invention the combination of the cooled stirrer and heated walls with all known means of spreading the reflux and bringing it into intimate contact with the ascending vapors. Thus I may attach to the cooled shaft rings, plates, fan blades, metallic strips, chains, wires and other objects and construction designed to interrupt the path of vapors, spread the reflux, and at the same time to preserve a relatively openwork structure.

In the following examples and description I have given several of the preferred embodiments of my invention, but it is to be understood that these are set forth for the purpose of illustration and not in limitation thereof.

In the accompanying drawings wherein like numbers refer to like parts, I have illustrated several embodiments of my invention wherein, Fig. 1 is an elevation partly in section of a fractionating still provided with a spiral-shaped and rotatable internally cooled means for condensing and returning condensate to the opposite heated wall.

Figure 1:
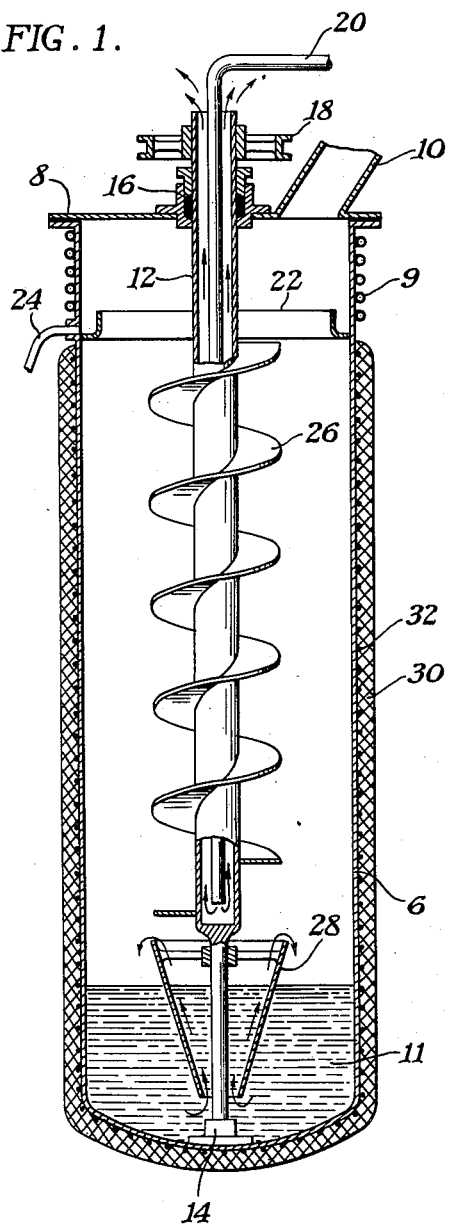

Referring to Fig. 1, numeral 6 designates an apparatus casing provided with a gas tight but removable cap 8 which is integral with a conduit 10 connected to vacuum pumps (not shown). Numeral 12 indicates a hollow shaft rigidly held in a central position in casing 6 by bearing 14 and packed gland 16. Numeral 18 designates a pulley which serves to drive shaft 12. Numeral 20 designates a stationary conduit for introducing cooling fluid into the central portion of shaft 12. Numeral 22 designates an annular gutter integral with the inside wall of casing 6 and numeral 24 a withdrawal conduit for removing liquid from gutter 22.

Shaft 12 carries a spiral-shaped member 26 and conical member 28 which are integral therewith and which rotate during rotation of shaft 12. Casing 6 is provided with a jacket 30 made of insulating material and with an electrical heating coil embedded in the insulating material as illustrated.

Figure 2:
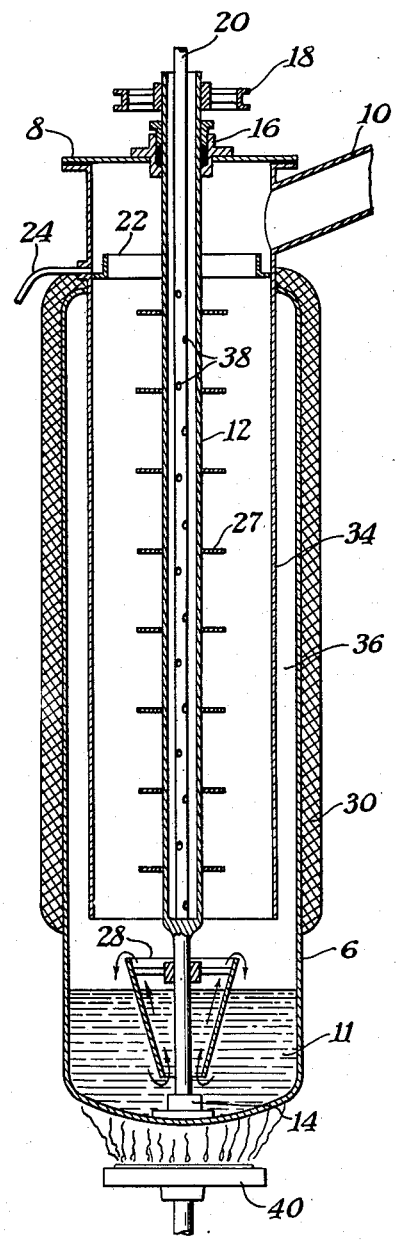
Fig. 2 is a vertical section of a still similar to that illustrated in Fig. 1 but showing an alternative method for heating the wall opposite from the cooled member.

Referring to Fig. 2, numeral 34 designates a cylinder which is positioned inside casing 6 and approximately concentric therewith so that there is a space 36 therebetween. Numeral 38 designates perforations in tube 20 so as to permit cooling fluid to be ejected against the walls of shaft 12 at desired points. Numeral 40 designates a gas burner for heating the lower portion of the apparatus.

Figure 3:
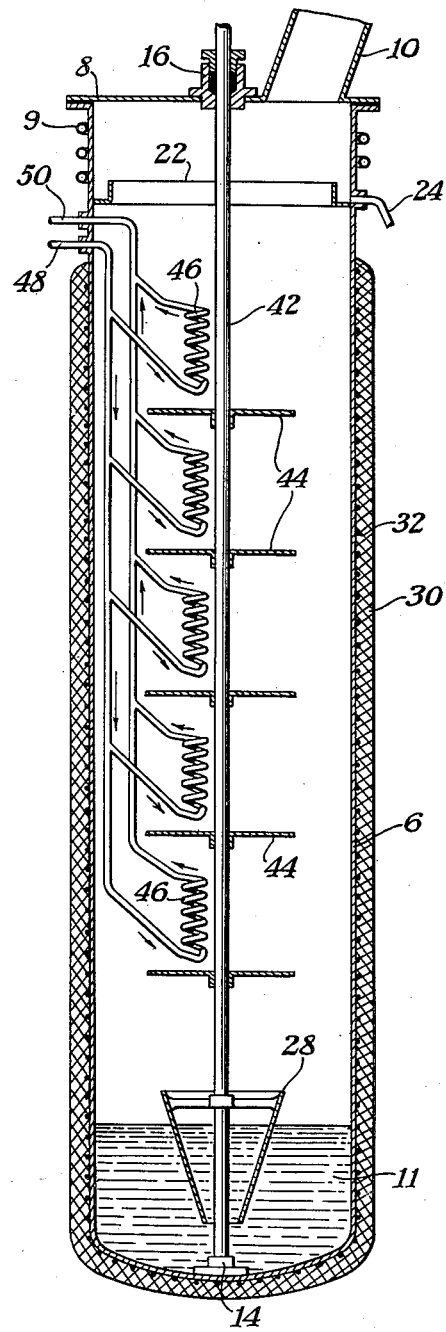
Fig. 3 is an elevation partly in section of a still having no movable internal cooling means but subsidiary rotatable means for returning cool fluid from the cooling means to the opposite heated wall.

Referring to Fig. 3, numeral 42 designates a centrally positioned shaft carried by bearing 14 and packed gland 16 which is analogous to hollow shaft 12 except that it is uncooled. Shaft 42 carries a series of spaced circular plates 44. Numeral 46 designates a plurality of cooling coils positioned above each of the plates 44 through which coils cool fluid circulates being introduced by way of conduit 48 and withdrawn by way of conduit 50.

Figure 4:
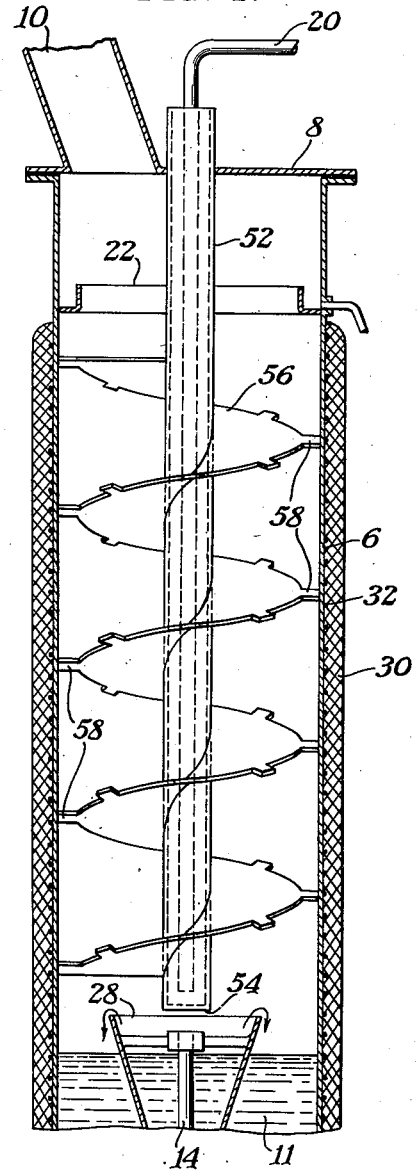
Fig. 4 is an elevation partly in section of a still embodying the features of Fig. 1 but having stationary means for returning cool condensate to the opposite heated wall.

Referring to Fig. 4, numeral 52 designates a central stationary shaft which is hollow and which is closed at the lower end by cap 54. Upon shaft 52 is mounted a stationary spiral 56 which is spaced from the wall of casing 6 by lugs 58.

In operating the apparatus illustrated in Fig. 1, cap 8 is removed and liquid to be distilled indicated by numeral 11 is introduced into the apparatus. The electrical heating element 32 is put into operation and the equipment is evacuated by way of conduit 10. Force is applied to pulley 18 to cause the shaft 12 and spiral element 26 to rotate. Liquid to be distilled is continuously stirred and circulated by rotation of the conical element 28, the liquid traveling upward due to centrifugal force spilling over the upper lip of the cone in the manner indicated by the arrows. When this liquid has reached distillation temperature the vapors pass upward between the walls of 6 and the cool surfaces 12 and 26. The vapors instead of passing upwardly with high velocity, are condensed at intermediate points on the element 26 or on shaft 12. The condensate is thrown by centrifugal force onto the opposite wall 6, down which it flows in a thin film. This condensate is, therefore, reheated on wall 6 to distillation temperature. These vapors thus generated on wall 6 again pass upward and become partially recondensed on the surfaces 12 and 26. There is thus a plurality of condensations and re-evaporations during the passage of the vapors through the column. Vapors which have been repeatedly refractionated are condensed on the upper part of the wall 6 by the cooling coils designated by the numeral 9. The condensate collects in gutter 22 and is withdrawn through conduit 24. Since the vapor stream is thus repeatedly cooled and reheated, it is continually deflected from its upward course and is thus prevented from passing through the equipment with high velocity and without fractionation.

The operation of the apparatus illustrated in Fig. 2 is much the same as that described in connection with Fig. 1. However, the vapors are condensed on the plates 27 instead of on the spiral 26 of Fig. 1. The effect of the plates in 27 is much the same as the spiral. The holes 38 in the central tube 20 permit the cooling fluid introduced through conduit 20 to be applied at any desired portion of the cooling surface 12. Thus, in Fig. 1 the cooling fluid was introduced only at the end of the conduit 20 so that it was heated to a certain extent by the time it reached the upper portion of conduit 12. However, the modification shown in Fig. 2 permits the cooling fluid to be applied at any desired point or points on conduit 12. It is evident that by controlling the amount of cooling fluid the proportion of the ascending vapors condensed on the shaft 12, and the proportion of condensate obtained in any particular section of the apparatus can be controlled. The vapors also pass upward in the space 36 between conduit 34 and casing 6. These vapors serve to warm the wall 34 so that external heating as illustrated in Fig. 1 is unnecessary. The liquid flung from the discs 27 onto the wall 34 is revaporized by the latent heat given up by the vapors in space 36. This evaporation is possible because the pressure will in general be less at the top of the apparatus than it is in the bottom or vaporizing section of the apparatus. This arrangement makes a self-compensating still which would perform under a wide variation of the supply of cooling fluid to the central shaft 12. Fractionated vapors condensed on the top air-cooled wall of casing 6 flow downward into gutter 22 and are withdrawn through conduit 24.

In operating the apparatus illustrated in Fig. 3, the still is heated and evacuated as described with Fig. 1. Shaft 42 and plates 44 are rotated as a unit and cooling fluid is introduced through conduit 48 and withdrawn through 50. Vapors passing upward are partially condensed on cooling coils 46. The condensate drips from the lower portion of these coils onto disc 44 immediately below. This liquid is then thrown by centrifugal force onto the opposite wall of casing 6. The repeated condensation and evaporation described above thus takes place as the vapors pass upward.

In operating the apparatus illustrated in Fig. 4, vapors are generated and the still is evacuated as described. Cooling fluid is introduced through conduit 20. However, shaft 52 and spiral 56 remain stationary. These elements, however, become cooled and vapors in their passage upward through the apparatus become condensed thereon. The liquid condensate flows by gravity toward the periphery of the spiral 56 and flows thence onto the lugs 58 and onto the wall of casing 6 where they are at least partially revaporized. There is thus a downward flow of condensate along the walls of casing 6, an upward flow of vapors, and repeated condensation and re-evaporation as described above. Agitating cup 28 is rotated by extending shaft 14 through a gas tight bearing in the base of the apparatus.

Many modifications may be made in my invention without departing from the spirit or scope thereof. Thus, I have found it convenient to illustrate equipment providing vaporizing means integral with the fractionating column. However, if desired, the material to be fractionated can be vaporized in a separate vaporizing means and introduced into the fractionating column. Also, the stirring means illustrated to assist in vaporizing the liquid to be distilled can be eliminated although this is not recommended. The amount of cooling applied to the cooled surface can be varied in order to control the amount of condensate and the number of condensations and re-evaporations. This, of course, will control the amount of residue or reflux flowing down the wall of the column, as well as the amount of vapors condensed and removed as a fraction from the top of the column. It is apparent that instead of discs, plates or helices, one may use wires, bristles, brushes, paddles or other means to convey and to distribute the liquid on the opposite heated surface. While I prefer cylindrical equipment because of its ease of construction, flat surfaces or any other desired shape may be employed. Likewise, if desired, the fractionated vapors need not be condensed in the column itself but may be led off through a wide aperture conduit to a suitable condenser.

What I claim is:

1. A fractional distillation apparatus, comprising a vertical tubular member having a uniform cross section, condensing means centrally positioned within said tubular member and distributed over the major portion of the length of said tubular member, means within said tubular member for moving condensate from said condensing means in a direction having a component radially of said tubular member to the inner surface of said tubular member, at a plurality of axially spaced positions, and for distributing it on said inner surface, and means for heating said tubular member to a temperature sufficient to at least partially re-evaporate said condensate.

2. A fractional distillation apparatus comprising a vertical tubular member having a uniform cross section, condensing means centrally positioned within said tubular member and distributed over the major portion of the length of said tubular member, means within said tubular member for centrifugally throwing condensate from said condensing means onto the inner surface of said tubular member at a plurality of axially spaced positions and means for heating said tubular member to a temperature sufficient to at least partially re-evaporate said condensate.

3. A fractional distillation apparatus comprising a vertical tubular member having a uniform cross section condensing means centrally positioned within said tubular member and distributed over the major portion of the length of said tubular member, said condensing means comprising a rotatable tubular member, substantially coaxial with said first named tubular member, means for circulating cooling fluid within said rotatable tubular member, means rotating said rotatable tubular member at a speed sufficient to centrifugally throw condensate from said rotatable tubular member to the inner surface of said first named tubular member, and means for heating said first named tubular member to a temperature sufficient to at least partially re-evaporate said condensate.

4. A fractional distillation apparatus comprising a stationary vaporizing surface and a condensing surface arranged in spaced apart relation and defining therebetween a confined and upwardly directed passageway for vapors, means for cooling said condensing surface, centrifugal conveying means disposed longitudinally within said passageway and arranged for moving condensate across said passageway from said condensing surface and distributing it onto said vaporizing surface at a plurality of positions along said passageway, means for heating said vaporizing surface to a temperature sufficient to at least partially re-evaporate said condensate, means adjacent the upper end of said passageway for totally condensing vapors reaching the upper end of said passageway, and means for collecting product from said total condensing means.

5. A fractional distillation apparatus comprising a generally vertical tubular member, condensing means centrally positioned within said tubular member and distributed over a substantial portion of the length of said tubular member, means for introducing vapors to be fractionated into a lower zone of said tubular member, rotatable means within said tubular member for centrifugally throwing condensate from said condensing means onto the inner surface of said tubular member at a multiplicity of axially spaced positions, means for heating said tubular member to a temperature sufficient to at least partially re-evaporate said condensate, means for evacuating said tubular member, and means for condensing and collecting vapors in an upper zone of said tubular member.

6. A fractional distillation apparatus comprising vapor generating means, opposed generally vertical vaporizing and condensing surfaces defining therebetween a confined passageway of substantially uniform cross-section, the lower end of said passageway communicating with said vapor generating means, means for evacuating said passageway, means adjacent the upper end of said passageway for totally condensing vapors reaching the upper end of said passageway, means for collecting and withdrawing product from said total condensing means, means for cooling said condensing surface, means for centrifugally throwing condensate across said passageway from said condensing surface onto said vaporizing surface at a plurality of spaced positions along said passageway, and means for heating said vaporizing surface to a temperature sufficient to at least partially re-evaporate said condensate.

7. A fractional distillation apparatus comprising vapor generating means, a generally tubular member of substantially uniform cross-section communicating with said vapor generating means and extending generally vertically upward from said vapor generating means, condensing means centrally positioned within said tubular member and extending through a substantial portion of the length of said tubular member, said condensing means comprising a rotatable tubular member arranged in substantially coaxial relation with said first-named tubular member, means for circulating cooling fluid within said rotatable tubular member, means for rotating said rotatable tubular member at a speed sufficient to centrifugally throw condensate from said rotatable tubular member to the inner surface of said first-named tubular member, means for heating said first-named tubular member to a temperature sufficient to at least partially re-evaporate said condensate, means for evacuating the space between said first-named tubular member and said rotatable tubular member, and means adjacent the upper end of said first-named tubular member for totally condensing and collecting vapors reaching an upper zone of said first-named tubular member.

8. A fractional distillation apparatus comprising an outer tubular member having a lower vaporizing zone and an upper condensing zone, an annular gutter mounted around the lower margin of said condensing zone and being arranged for collecting condensate from said condensing zone, means for withdrawing condensate from said gutter, an inner tubular member generally concentric with said outer tubular member and extending throughout a substantial portion of the length of said vaporizing zone of said outer tubular member, means for cooling said inner tubular member, means for conveying condensate portions from said inner tubular member and distributing them onto said vaporizing zone of said outer tubular member at a multiplicity of levels, and means for heating said vaporizing zone of said outer tubular member to a temperature sufficient to at least partially re-evaporate said condensate portions.

9. A fractional distillation apparatus comprising spaced apart opposed surfaces defining therebetween an upwardly directed confined passageway for vapors, the first of said surfaces having a lower vaporizing zone and an upper total condensing zone, means for collecting product from said total condensing zone, means for cooling the second of said surfaces, means disposed along said passageway for conveying condensate across said passageway from said second surface and for distributing it on the vaporizing zone of said first surface at spaced positions along said passageway, and means for heating said vaporizing zone of said first surface to a temperature sufficient to at least partially re-evaporate said condensate, said first surface being constructed and arranged for downward flow of condensate over said surface during operation of said apparatus.

10. A fractional distillation apparatus comprising a lower vapor generating portion, an intermediate fractionating portion, an upper total condensing portion, and gutter means arranged for collecting product from said total condensing portion, said intermediate fractionating portion comprising a vaporizing surface and a condensing surface defining therebetween a confined and upwardly directed passageway for vapors, means for cooling said condensing surface, centrifugal conveying means disposed along said passageway and arranged for moving condensate across said passageway from said condensing surface and onto said vaporizing surface, and means for heating said vaporizing surface to a temperature sufficient to at least partially re-evaporate said condensate, said vaporizing surface being constructed and arranged for downward flow of unvaporized residue over said vaporizing surface.

11. The process which comprises passing an annular stream of vapors along an upwardly directed path between concentric surfaces, condensing portions of said vapors out of said stream onto one of said surfaces, centrifugally conveying the resulting condensate portions across said stream of vapors onto the other of said surfaces, partially revaporizing said condensate portions from said last-named surface back into said stream of vapors, flowing the unvaporized residue of said condensate portions downwardly over said last-named surface in the form of a thin film, repeating said condensing and revaporizing at successively higher levels along said path, totally condensing said vapors in an upper zone along said path, and collecting and withdrawing product from said upper zone.

12. The process which comprises passing a stream of vapors upwardly through an annular space between generally concentric tubular members, cooling the inner tubular member, heating the outer tubular member, and, during passage of said vapors upwardly through said space, progressively fractionating said vapors at a multiplicity of successively higher levels by repeatedly condensing portions of said vapors upon said inner tubular member, rotating said inner tubular member at a speed effective to centrifugally throw the resulting condensate portions across said space onto said outer tubular member, partially revaporizing said condensate portions from said outer tubular member back into the upflowing vapor stream and causing the unvaporized residue of said condensate portions to flow downwardly along said outer tubular member.

KENNETH C. D. HICKMAN.

REFERENCES CITED

The following references are of record in the file of this patent:

UNITED STATES PATENTS

| Number | Name | Date |
|---|---|---|
| 1,150,115 | Heinze | Aug. 17, 1915 |
| 2,210,926 | Hickman | Aug. 13, 1940 |
| 2,210,927 | Hickman | Aug. 13, 1940 |
| 2,313,546 | Hickman | Mar. 9, 1943 |
| 2,333,712 | Eckey | Nov. 9, 1943 |
| 2,406,421 | Wollner et al. | Aug. 27, 1946 |
| 2,446,997 | Brewer et al. | Aug. 17, 1948 |

FOREIGN PATENTS

| Number | Country | Date |
|---|---|---|
| 1,380 | Great Britain | of 1915 |
| 545,781 | Great Britain | of 1942 |

OTHER REFERENCES

Industrial and Engineering Chemistry, Analytical Edition, vol. 10, page 450 (1938), vol. 12, pages 468–471 (1940). (Copies in Scientific Library.)